Sept. 25, 1962  A. B. VANE  3,056,096
MULTIPLEXER APPARATUS
Filed May 23, 1956  4 Sheets-Sheet 2

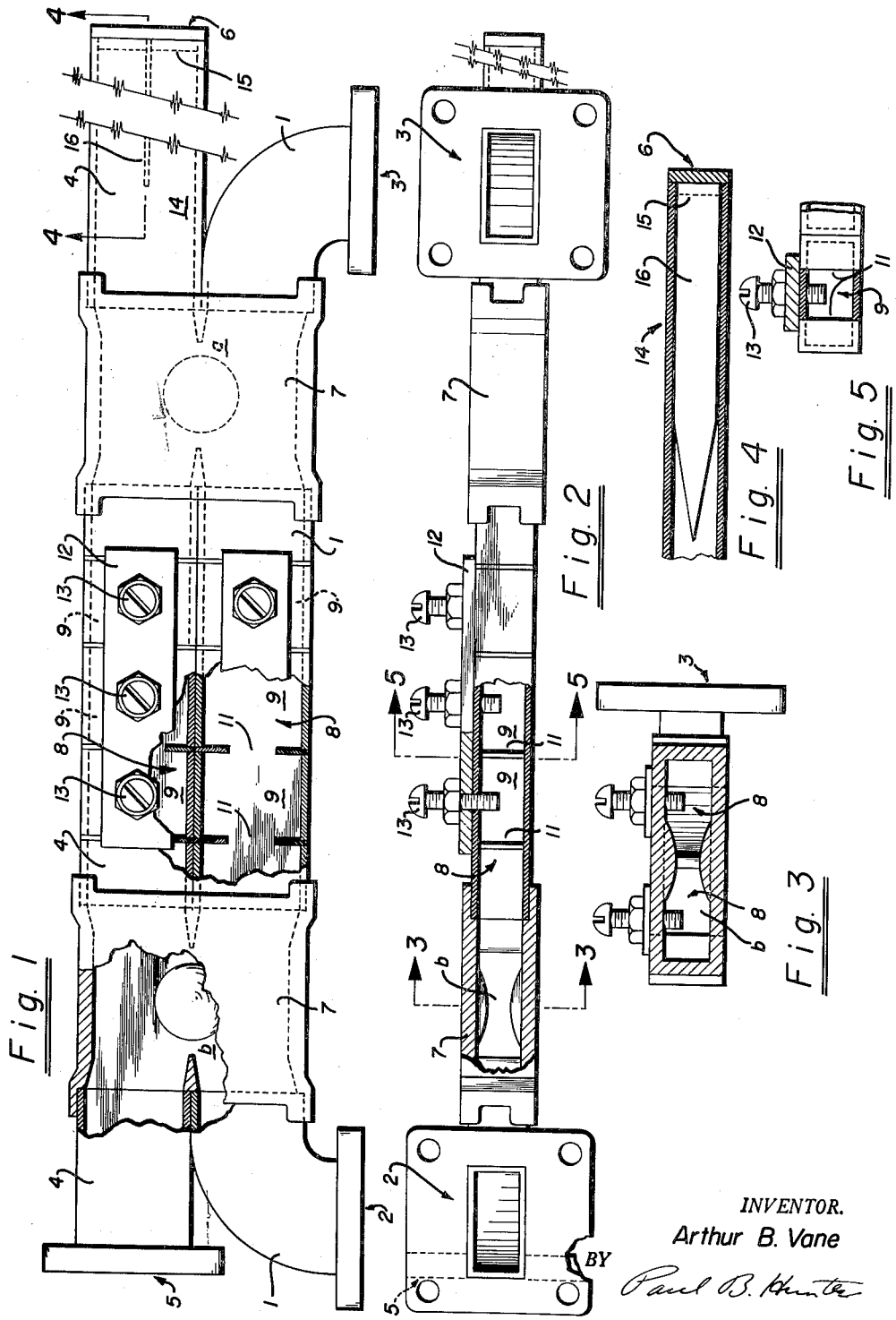

INVENTOR.
Arthur B. Vane
BY
Paul B. Hunter
Attorney

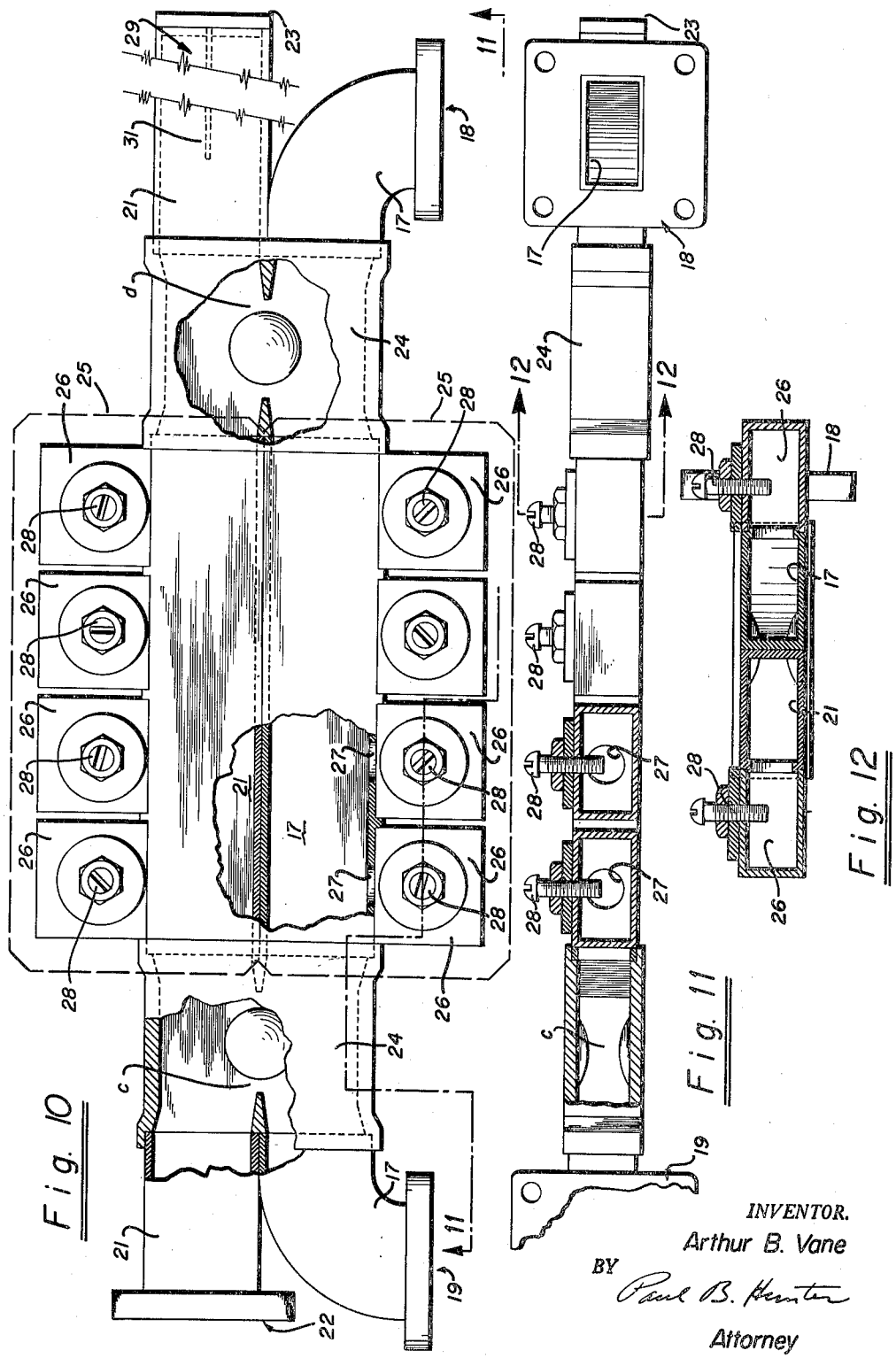

Sept. 25, 1962    A. B. VANE    3,056,096
MULTIPLEXER APPARATUS
Filed May 23, 1956    4 Sheets-Sheet 4

INVENTOR.
Arthur B. Vane
BY
Paul B. Hunter
Attorney

United States Patent Office 3,056,096
Patented Sept. 25, 1962

3,056,096
MULTIPLEXER APPARATUS
Arthur B. Vane, Menlo Park, Calif., assignor to Varian Associates, San Carlos, Calif., a corporation of California
Filed May 23, 1956, Ser. No. 586,781
3 Claims. (Cl. 333—10)

The present invention relates in general to microwave multiplexers and more specifically to novel improved high frequency multiplexer apparatus which will allow the use of a single antenna and/or transmission line for simultaneous transmission and reception of signals within a plurality of frequency bands.

The principal object of the present invention is to provide a novel improved broad band high power multiplexer which will allow the use of a minimum of filter design thereby greatly enhancing the design and construction of microwave multiplexer apparatus.

One feature of the present invention is the provision of a novel multiplexer design whereby a band of frequencies at high power may be separated from a spectrum of frequencies or separately applied to other bands of frequencies without the necessity of providing a filter designed to handle high power.

Another feature of the present invention is the provision of a novel waveguide multiplexer apparatus wherein a plurality of diplexer sections are successively coupled together to provide a multiplexer capable of handling $n$ number of separate frequency bands.

Another feature of the present invention is a novel multiplexer design wherein the relative phases of signals within certain bands are not shifted with respect to each other in passing through the multiplexer apparatus.

Figure 7:
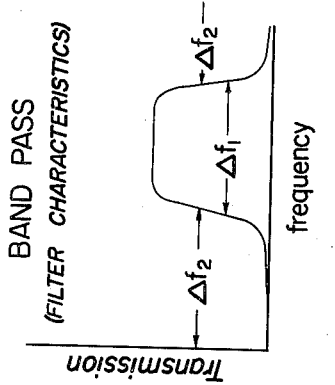
Figure 9:
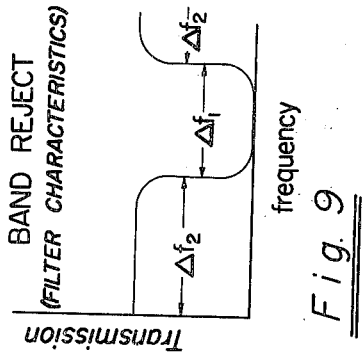
Figure 6:
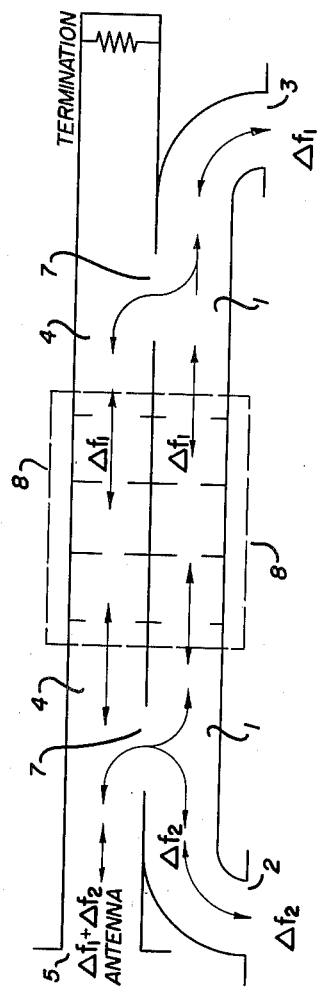
Figure 8:
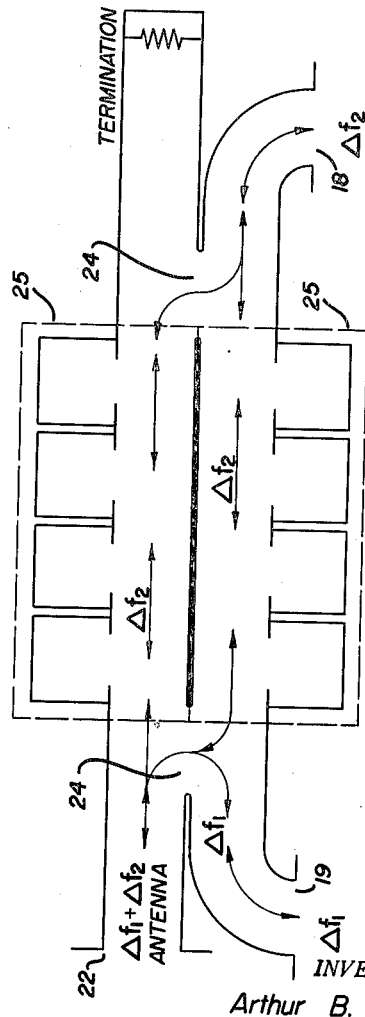
Figure 13:
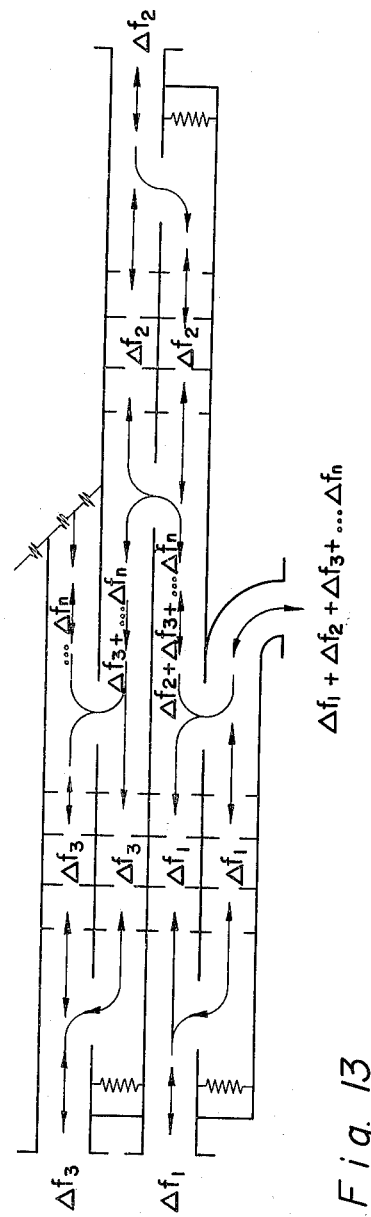
Figure 14:
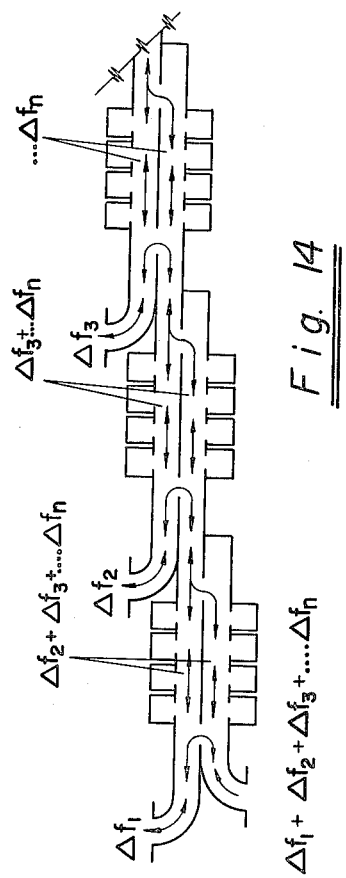

These and other features and advantages of the present invention will be more apparent after a perusal of the following specification taken in connection with the accompanying drawings wherein, FIG. 1 is a plan view partly in section of a diplexer, FIG. 2 is a side view partly in section of the structure of FIG. 1, FIG. 3 is a cross sectional view of the structure of FIG. 2 taken along line 3—3 in the direction of the arrows, FIG. 4 is an enlarged cross sectional view of a portion of the structure of FIG. 1 taken along line 4—4 in the direction of the arrows, FIG. 5 is a cross sectional view of a portion of the structure of FIG. 2 taken along line 5—5 in the direction of the arrows, FIG. 6 is a schematic drawing showing electrical operation of the structure of FIG. 1, FIG. 7 is a normalized graph of transmission amplitude versus frequency for the filter structure of FIG. 1, FIG. 8 is a schematic drawing showing electrical operation of the structure of FIG. 10, FIG. 9 is a normalized graph of transmission amplitude versus frequency for the filter structure of FIG. 10, FIG. 10 is a plan view partly in section of a second embodiment of the present invention, FIG. 11 is a side view partly in section of the structure of FIG. 10, FIG. 12 is a cross sectional view of the structure of FIG. 11 taken along line 12—12 in the direction of the arrows, FIG. 13 is a schematic diagram of a novel multiplexer apparatus of the band pass type capable of handling $n$ number of separate frequency bands, and FIG. 14 is a schematic diagram of a novel multiplexer waveguide apparatus of the band reject type capable of handling $n$ number of different frequency bands.

Referring now to the FIGS. 1 through 7 there is shown a diplexer. A main rectangular waveguide 1 having terminals 2 and 3 is coupled to an auxiliary rectangular waveguide 4 having terminals 5 and 6. The auxiliary waveguide 4 runs parallel to the main waveguide 1 and is directionally coupled thereto through two coupling apertures $a$ and $b$ in the common narrow side walls thereof. More specifically, the main waveguide 1 and auxiliary waveguide 4 are joined together at their common apertures $a$ and $b$ by two short slot directional coupler-like hybrid junctions 7. The short slot directional coupler-like hybrid junctions 7, shown here, are fully described in an article by Henry J. Riblet appearing in The Proceedings of the I.R.E. of February 1952, page 180.

Two substantially identical pass band filters 8 are interposed in the sections of main waveguide 1 and auxiliary waveguide 4 between the two short slot hybrid junctions 7. In this embodiment the two substantially identical filters 8 are of the direct coupled cavity type. That is, each filter comprises three direct coupled cavities 9 formed by inductive type irises 11 placed in the waveguide in spaced apart relation. A reinforcing plate 12 is secured, as by brazing, over the filter section on the broad side of the main and auxiliary waveguides 1 and 4. Six holes are bored through the reinforcing plates 12 and into the waveguides 1 and 4, one hole into each of the cavity portions 9 forming filter 8. Capacitive tuning screws 13 are screwed through the bores into the individual cavity portions of the filters for tuning thereof.

An R.F. termination 14 is provided at terminal 6 of the auxiliary waveguide 4 by providing a short circuiting plate 15 over the end of the guide having a resistive card 16 secured thereto. The R.F. termination attenuates R.F. energy leaking into this arm of the diplexer. The other end of auxiliary waveguide 4 at terminal 5 is flanged for connecting to other pieces of equipment and provides means for the ingress and egress of R.F. energy to and from the novel diplexer apparatus. Flanges are similarly provided on terminals 2 and 3 of the main waveguide 1.

In operation (see FIGS. 6 and 7) a frequency spectrum is received by an antenna and fed to terminal 5. Assume the frequency spectrum contains a band of frequencies $\Delta f_1$ and all other frequencies $\Delta f_2$ contained within the spectrum. Due to the design of the filter sections 8, the electrical transmission characteristics of which are shown in FIG. 7, only those frequencies contained within the band of frequencies $\Delta f_1$ are transmitted through the filter sections 8. The other frequencies not transmitted by the filters are rejected therefrom and propagated out terminal 2.

Due to the action of the hybrid directional coupler 7 and filter sections 8 the energy contained within the band of frequencies $\Delta f_1$ is divided such that one-half of the power is transmitted through the main waveguide 1 and the other half is transmitted through the auxiliary waveguide 4 to be recombined at the second hybrid directional coupler 7 and thence transmitted to terminal 3. Thus it can be seen that the energy contained within a spectrum of frequencies $\Delta f_1 + \Delta f_2$ which is received by the diplexer at terminal 5 can be selectively split such that the energy contained within the frequency band $\Delta f_1$ can be taken out of terminal 3 and all other frequencies represented by $\Delta f_2$ can be taken from terminal 2.

Within the hybrid directional coupler 7 energy that passes through the aperture $a$ or $b$ from one waveguide to the other experiences a 90° phase shift. This produces the directional characteristics of the hybrid directional coupler 7 and distinguishes it from other couplers such as, for example, magic tees where the energy is divided into two arms without a relative phase shift.

Due to the electrical symmetry of the filter section 8 the action of the diplexer is reciprocal. That is, if energy within the frequency band $\Delta f_1$ is applied to the diplexer at terminal 3 this energy will be propagated to the terminal 5 (antenna) and substantially no $\Delta f_1$ energy will be propagated out of terminal 2. Conversely, if energy contained within the band of frequencies $\Delta f_2$ is applied at terminal 2 substantially none of this energy will be propagated out of terminal 3, but instead substantially all of the $\Delta f_2$ energy applied at terminal 2 will be propagated through the hybrid junction 7 and out of terminal 5.

Relative phase shift is often encountered between signals within a frequency band when this band of frequencies is passed through a waveguide filter. One advantage that the present diplexer design offers is that for those frequencies contained within the band of frequencies $\Delta f_2$ which do not pass through the band of pass filter 8 (FIG. 6) there is no relative phase shift between the signals of different frequencies. In other words, for the band pass diplexer apparatus (FIGS. 1-7) no relative phase shift is encountered in the band of frequencies outside of the pass band of the filter 8.

The present diplexer design is especially suited for high power transmission. Design of waveguide filters capable of handling very high power signals is extremely difficult due to the possible voltage breakdown and excessive power dissipation problems associated with high power transmissions. In the band pass type diplexer apparatus as shown in FIGS. 1-7 it can be seen that a very high power signal may be handled by the diplexer without having to design the filter 8 to pass these very high power signals. The apparatus is designed such that the high power signals are contained within that band of frequencies designated as $\Delta f_2$ which bypass the filter 8 and thus do not produce breakdown nor power dissipation problems therein.

Referring now to FIGS. 10 through 12 there is shown the second diplexer design. A main rectangular waveguide 17 having terminals 18 and 19 is coupled to an auxiliary rectangular waveguide 21 having terminals 22 and 23. The auxiliary waveguide 21 runs parallel to the main waveguide 17 and is directionally coupled thereto through two coupling apertures $c$ and $d$ in the common side walls thereof. More specifically, the main waveguide 17 and auxiliary waveguide 21 are joined together at their common apertures $c$ and $d$ by two short slot directional coupler-like hybrid junctions 24. Thus far the apparatus described in FIG. 10 is identical with the apparatus, previously described, of FIG. 1.

Two substantially identical band reject filters 25 are interposed in the sections of main waveguide 17 and auxiliary waveguide 21 between the two short slot hybrid junctions 24. In this embodiment the two identical filters each comprise four cavity resonators 26 coupled to the respective waveguide sections 17 and 21 through coupling irises 27. Individual capacitive tuning screws 28 are provided for each cavity resonator 26 making up the filters 25.

An R.F. termination 29 is provided at terminal 23 of the auxiliary waveguide 21 by providing a short circuiting plate over the end of the guide having a resistive card 31 secured thereto. The R.F. termination attenuates R.F. energy leading into this arm of the diplexer. The other end of the auxiliary waveguide, terminal 22, is flanged for connecting to other pieces of equipment and provides means for egress and ingress of R.F. energy. Flanges are similarly provided on terminals 19 and 18 of the main waveguide 17.

In operation (see FIGS. 8 and 9) a frequency spectrum containing frequencies within a band $\Delta f_1$ and all other frequencies $\Delta f_2$ within the spectrum are received by an antenna and fed to terminal 22. The filters 25 have been designed to reject frequencies contained within the band of frequencies $\Delta f_1$ and to pass all other frequencies. Thus the energy contained within the frequency band $\Delta f_1$ which enters at terminal 22 is rejected by the filters 25 and is propagated out through terminal 19. On the other hand, all other frequencies $\Delta f_2$ are divided between and propagated through the filters 25, recombined at hybrid junction 24 and propagated to terminal 18. Thus it can be seen that due to the action of the novel band reject diplexer apparatus of FIG. 10 that energy contained within a selected band of frequencies $\Delta f_1$ may be separated from a frequency spectrum containing many other frequencies applied at terminal 22 of the device.

Due to the electrical symmetry of the band reject filters 25 the operation of the diplexer is reciprocal. That is, if energy contained within the frequency band $\Delta f_2$ is applied to terminal 18 of the device this energy will be propagated to the antenna terminal 22 and substantially none of the $\Delta f_2$ energy will be propagated out of terminal 19. Conversely, if $\Delta f_1$ energy is applied at terminal 19 it is propagated to the antenna terminal 22. Due to the action of band reject filters 25 substantially none of the $\Delta f_1$ energy applied at terminal 19 is propagated to terminal 18.

Relative phase shift between the signals of different frequencies contained within the band of frequencies $\Delta f_2$ (passed by the band reject filter 25) is avoided by the use of the diplexer apparatus as shown in FIG. 8 because the relative phase shifts introduced by the waveguide filter 25 will be confined to that band of frequency, $\Delta f_1$ (rejected by the band reject filter) for which interaction is obtained with the band reject filter 25. In other words, relative phase shift will only be obtained in the band of frequencies $\Delta f_1$.

High power signals may easily be handled by the band reject diplexer configuration shown in FIGS. 8-12 by designing the band reject filters 25 to reject only the low power signals whereby only a low power filter design is necessary. In this case the high power signals would be contained within the band of frequencies $\Delta f_2$ which would be readily passed by the filter 25 without producing excessive voltages likely to produce breakdown or without producing excessive heat dissipation problems.

Thus far in this specification the description of the present invention has been limited to novel diplexer apparatus. However, the principles thus far evolved are much more general and have wider application than to just diplexer apparatus. In fact the principles are applicable in general to multiplexer apparatus and may be utilized to design waveguide networks wherein a single waveguide transmission line may be used for the simultaneous transmission and reception of a great many different frequency bands.

Referring now to FIG. 13 there is shown schematically a multiplexer apparatus utilizing the band pass diplexer principles heretofore described with relation to FIGS. 1 through 7. It is apparent from an inspection of FIG. 13 that any number $n$ of finite frequency bands may be separated from an incoming frequency spectrum or separately applied to produce a frequency spectrum by successively joining together a plurality of band pass diplexers previously described. Each diplexer will have its filter network designed to pass only that frequency band which it is desired to separate or selectively apply.

Referring now to FIG. 14 there is shown a novel multiplexer for selectively applying or separating a plurality of frequency bands utilizing a single waveguide transmission line. As can be seen from FIG. 14 the novel multiplexer comprises a plurality of band reject diplexers successively joined together. Each diplexer will have its filter network designed to pass all frequencies within the frequency spectrum excepting the frequency it is desired to separate.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A waveguide multiplexer apparatus for allowing a single transmission line to serve a system for simultaneous transmission or reception of a plurality of frequency bands comprising a plurality of waveguide diplexer means successively coupled together, each diplexer means comprising a main waveguide means, an auxiliary waveguide means, said main and auxiliary waveguide means directionally coupled together by at least two short slot directional coupler-like hybrid junctions, and substantially identical waveguide filter means associated with said main and auxiliary waveguide means between said short slot directional coupling means.

2. In an apparatus as claimed in claim 1 wherein each of said waveguide filter means comprises a band pass filter.

3. In an apparatus as claimed in claim 1 wherein each of said waveguide filter means comprises a band reject filter means.

References Cited in the file of this patent

UNITED STATES PATENTS

| | | |
|---|---|---|
| 2,531,419 | Fox | Nov. 28, 1950 |
| 2,531,447 | Lewis | Nov. 28, 1950 |
| 2,586,993 | Riblet | Feb. 26, 1952 |
| 2,739,287 | Riblet | Mar. 20, 1956 |
| 2,851,665 | McCann | Sept. 9, 1958 |
| 2,869,081 | Teeter | Jan. 13, 1959 |

OTHER REFERENCES

Lawson et al.: "The Design of Microwave Filters," in: Microwave Transmission Circuits, vol. 9 of Radiation Laboratory Series, McGraw-Hill Book Co., New York (1948), pages 613–715 (chapter 10). (Pages 656 and 704 relied on.)